(12) United States Patent
Eickhoff et al.

(10) Patent No.: US 10,756,371 B2
(45) Date of Patent: Aug. 25, 2020

(54) HYBRID FUEL CELL

(71) Applicant: Honeywell International Inc., Morris Plains, NJ (US)

(72) Inventors: Steven J. Eickhoff, Brooklyn Park, MN (US); Jeffrey Michael Klein, Minneapolis, MN (US)

(73) Assignee: Honeywell International Inc., Morris Plains, NJ (US)

(*) Notice: Subject to any disclaimer, the term of this patent is extended or adjusted under 35 U.S.C. 154(b) by 229 days.

(21) Appl. No.: 15/676,853

(22) Filed: Aug. 14, 2017

(65) Prior Publication Data
US 2018/0053953 A1 Feb. 22, 2018

Related U.S. Application Data

(60) Provisional application No. 62/376,225, filed on Aug. 17, 2016.

(51) Int. Cl.
H01M 8/06 (2016.01)
H01M 10/052 (2010.01)
H01M 2/10 (2006.01)
H01M 8/2475 (2016.01)
H01M 16/00 (2006.01)
H01M 8/065 (2016.01)

(52) U.S. Cl.
CPC ........... H01M 8/06 (2013.01); H01M 2/1022 (2013.01); H01M 8/2475 (2013.01); H01M 10/052 (2013.01); H01M 16/006 (2013.01); H01M 8/065 (2013.01)

(58) Field of Classification Search
None
See application file for complete search history.

(56) References Cited

U.S. PATENT DOCUMENTS

| 7,807,312 B2 | 10/2010 | Brantley et al. |
| 9,160,022 B2 | 10/2015 | Pruett |
| 2003/0138676 A1 | 7/2003 | Leban |

(Continued)

FOREIGN PATENT DOCUMENTS

| CN | 1694289 A | 11/2005 |
| CN | 104638285 A | 5/2015 |

(Continued)

OTHER PUBLICATIONS

"European Application Serial No. 17186403.6, Ectended European Search Report dated Oct. 27, 2017", 5 pgs.

(Continued)

Primary Examiner — Rena Dye Cronin
(74) Attorney, Agent, or Firm — Schwegman Lundberg & Woessner, P.A.

(57) ABSTRACT

A power generator includes a container having a cross section suitable for wearing by a person, the container including a nano-porous insulation. A fuel cell and fuel cell cartridge are disposed within the container. Power management electronics are supported by the container and coupled to the fuel cell. A charge storage device is supported by the container and electrically coupled to the power management electronics and the fuel cell. A connector is supported by the container and coupled to the charge storage device to distribute power to one or more electrical loads.

21 Claims, 11 Drawing Sheets

(56) References Cited

U.S. PATENT DOCUMENTS

| | | | |
|---|---|---|---|
| 2005/0096661 A1* | 5/2005 | Farrow | A61B 17/1628 606/79 |
| 2006/0115698 A1 | 6/2006 | Sakai et al. | |
| 2007/0289974 A1 | 12/2007 | Blair et al. | |
| 2010/0178573 A1* | 7/2010 | Eickhoff | H01M 4/383 429/421 |
| 2011/0311895 A1 | 12/2011 | Spare et al. | |
| 2012/0242274 A1* | 9/2012 | Pruett | H01M 8/002 320/101 |
| 2015/0111120 A1* | 4/2015 | Eickhoff | H01M 8/04208 429/423 |

FOREIGN PATENT DOCUMENTS

| | | |
|---|---|---|
| CN | 108054474 | 5/2018 |
| EP | 2924724 A1 | 9/2015 |
| EP | 3285329 A1 | 2/2018 |
| JP | 2005-116292 A | 4/2005 |

OTHER PUBLICATIONS

Abe, Hiroya, et al., "Dry Powder Processing of Fibrous Fumed Silica Compacts for Thermal Insulation", *Am. Ceram. Soc.*, 88(5). (2005), 1359-1361.

Alam, M., et al., "Experimental characterisation and evaluation of the thermo-physical properties of expanded perlite—Fumed silica composite for effective vacuum insulation panel (VIP) core", *Energy and Buildings*, vol. 69, (Feb. 2014), 442-450.

Davraz, Metin, et al., "Performance properties of vacuum insulation panels produced with various filling materials", *Science and Engineering of Composite Materials*, 21(4), (2014), 7 pgs.

"Development and evaluation of portable and wearable fuel cells for soldier use", U.S. Army RDECOM CERDEC CP&I, Power Division, 5100 Magazine Road, Aberdeen Proving Ground, MD 21005, USA.

"Portable", [online]. FuelCellToday. [retrieved on Jul. 20, 2016]. Retrieved from the Internet: <URL: http:..www.fuelcelltoday.com/applications/portable>, (2016), 1 pg.

"Protonox military power management products", [online]. (c) 2016 Protonex. [retrieved on Jul. 20, 2016]. Retrieved from the Internet: <URL: https:/protonex.com>, (2016), 6 pgs.

Thampan, T., et al., "Development and evaluation of portable and wearable fuel cells for soldier use", Journal of Power Sources, 259, (2014), 276-281.

"European Application Serial No. 17186403.6, Response filed Apr. 9, 2018 to Extened European Search Report dated Oct. 27, 2017", 8 pgs.

"European Application Serial No. 17186403.6, Communication Pursuant to Article 94(3) EPC dated May 30, 2018", 3 pgs.

"European Application Serial No. 17186401.6, Response filed Sep. 4, 2018 to Communication Pursuant to Article 94(3) EPC dated May 30, 2018", 16 pgs.

"Chinese Application U.S. Appl. No. 201710709749.7, Office Action dated Apr. 26, 2020", (w/ English Translation), 18 pgs.

* cited by examiner

HYBRID FUEL CELL

RELATED APPLICATION

This application claims priority to U.S. Provisional Application Ser. No. 62/376,225 (entitled TRANSIENT HYBRID FUEL CELL, filed Aug. 17, 2016) which is incorporated herein by reference.

BACKGROUND

Power remains one of the greatest challenges facing the dismounted soldier. In a typical 72 hr mission in remote areas, a US solder may carry up to 70 individual batteries collectively weighing more than 20 lbs. Recent advances in power distribution/management systems such as SWIPES (Soldier Worn Integrated Power Equipment System) have reduced the number/type of batteries carried.

Improvements in battery form factor such as CWB (conformal wearable battery) have improved wearability, but have not improved battery performance, and the battery needs to be recharged daily. Soldiers, particularly special operators, often do not have access to charging equipment and are still forced to use bulky, heavy lithium primary batteries. Special operators may be further burdened by having to pack out their spent batteries to avoid detection.

SUMMARY

A power generator includes a container having a cross section suitable for wearing by a person, the container including a nano-porous insulation. A fuel cell and fuel cell cartridge are disposed within the container. Power management electronics are supported by the container and coupled to the fuel cell. A charge storage device is supported by the container and electrically coupled to the power management electronics and the fuel cell. A connector is supported by the container and coupled to the charge storage device to distribute power to one or more electrical loads.

A method includes providing ambient air through an insulated container to a fuel cell based power generator, the air providing oxygen to a cathode of a fuel cell and water to a hydrogen producing fuel, wherein the insulated container has a cross section suitable for wearing by a person and the container includes a nano-porous insulation, generating hydrogen via the hydrogen producing fuel, providing the hydrogen to an anode of the fuel cell, generating electricity via the fuel cell responsive to being provided oxygen and hydrogen, and proving the generated electricity to a charge storage device for powering at least one electrical load external to the insulated container via an electrical connector.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Power remains one of the greatest challenges facing the dismounted soldier. In a typical 72 hr mission in remote areas, a US solder may carry up to 70 individual batteries collectively weighing more than 20 lbs. Recent advances in power distribution/management systems such as SWIPES (Soldier Worn Integrated Power Equipment System) have reduced the number/type of batteries carried.

Improvements in battery form factor such as CWB (conformal wearable battery) have improved wearability, but have not improved battery performance. Batteries still need to be recharged daily. Soldiers, particularly special operators, often do not have access to charging equipment and are still forced to use bulky, heavy lithium primary batteries. Special operators may be further burdened by having to pack out their spent batteries to avoid detection.

To address these challenges, a Transient Fuel Cell (TFC) in CWB form factor combines improved wearability and electrical performance, with end of life transience capability.

Figure 1:
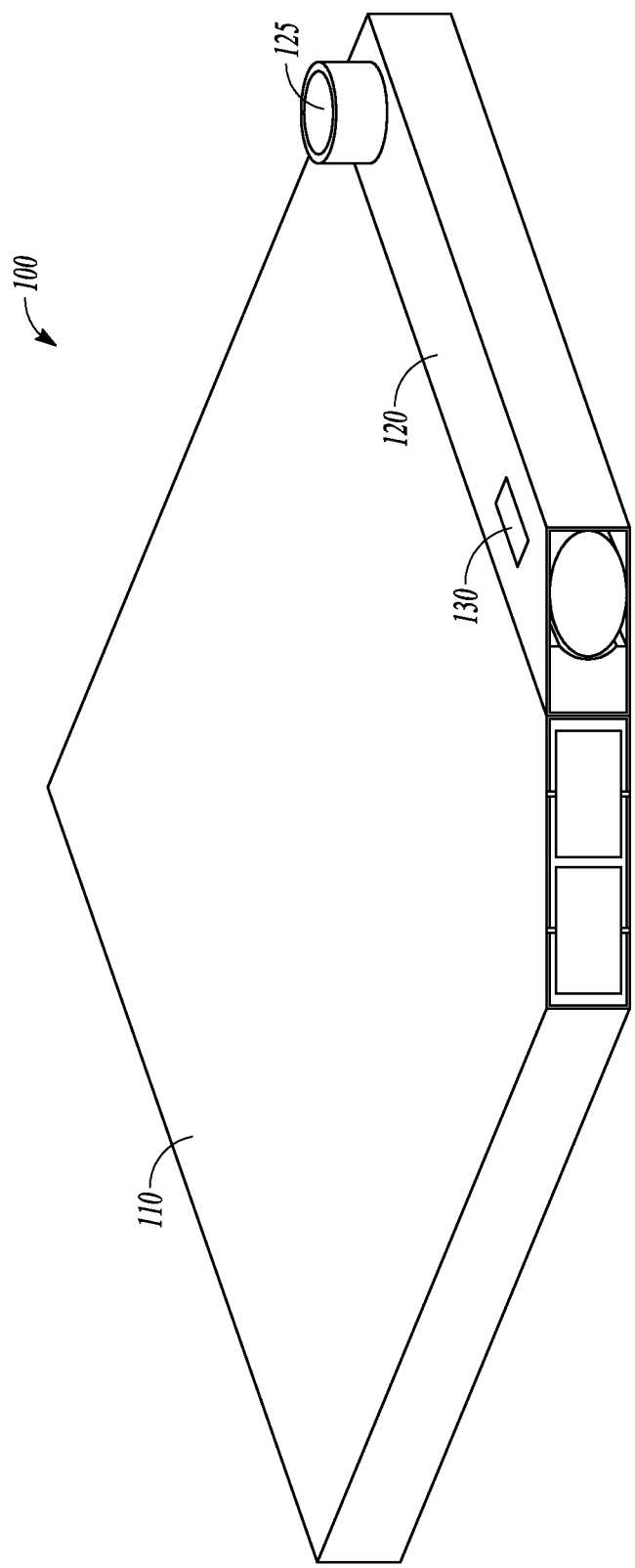
FIG. 1 is a perspective representation of a transient fuel cell device according to an example embodiment.
Figure 2A:
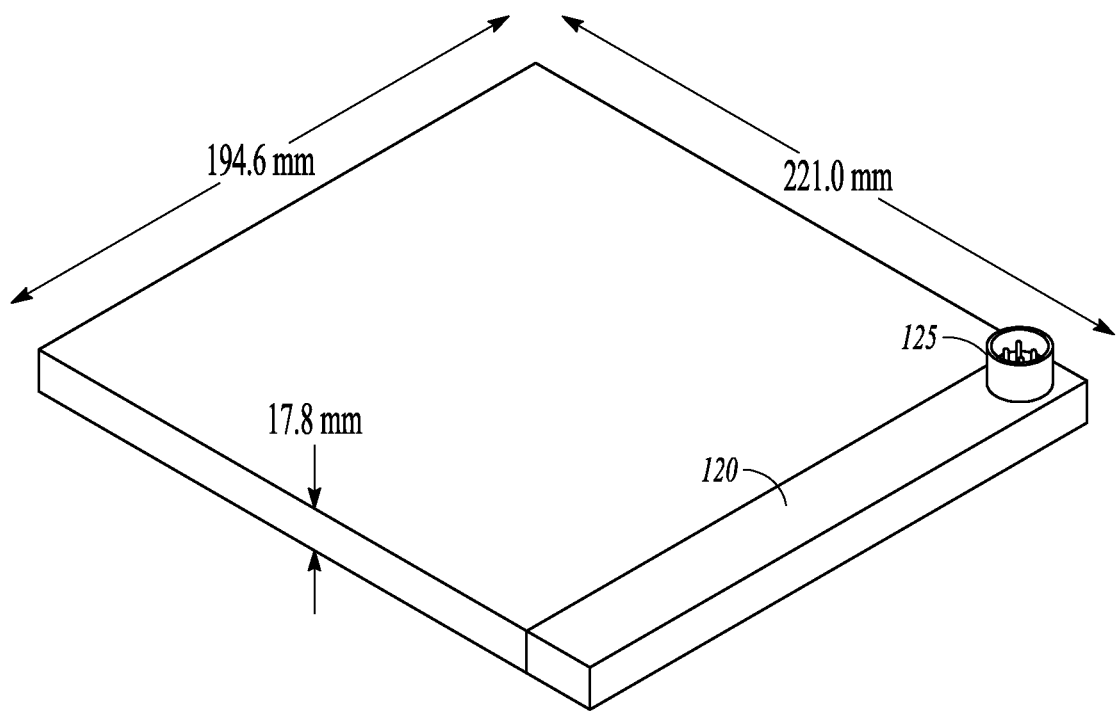
FIG. 2A is a perspective representation of the transient fuel cell device of FIG. 1 showing example dimensions according to an example embodiment.

FIG. 1 and FIG. 2A illustrate two perspective representations of a TFC 100 according to an example embodiment. The larger area in FIG. 1 is a fuel cell and fuel cartridge 110. The cartridge 110 comprises transient polymer packaging with patterned resistors, a transient fuel cell, and transient micro-pelletized $LiAlH_4$ fuel. One edge of the cartridge has a detachable electronics module 120 (non-transient), with an electrical connector 125 for providing power to one or more loads, such as various electronic devices. The electronics module in one embodiment may include a charge storage device such as a 3× Li-ion 18650, power management circuitry, capacity monitor/display, and a fast transient trigger button or switch, such as for example a mechanical, electrical, optical or other type of switch 130. The connector 125 may be adapted to interface with a SWIPES power distribution system.

FIG. 2A illustrates example dimensions of TFC 100 that are sized to be convenient for a person to carry in field operations. In one embodiment, the dimensions are selected to provide a fairly flat or thin cross section rectangular shape that can be conveniently inserted into body armor pockets. Since the cartridge is formed of polymer, the cartridge may be somewhat flexible to aid in conforming to the body of a wearer. Example dimensions shown include 194.6 mm×221.0 mm×17.8 mm. The thin cross section of 17.8 mm facilitates the insertion of the TFC 100 into body armor pockets. Other dimensions, such as a thickness of less than 20 mm or less than 25 mm, or less than 30 mm may be suitable for wearing by a person. The thickness selected may be a tradeoff of size versus total energy needed for a mission or activity versus comfort and ability of a person to conveniently carry the cartridge. In some embodiments, characteristics of the TFC 100 may include operation in temperature extremes of 40 C to 93 C. 3), stable dimension of X (less than=7.66 in), Y (less than=8.70 in), Z (0.50 to 0.70 inches), and a maximum weight of 2.6 lbs. 4). TFC 100 should be compatible with soldier, or other type of wearer equipment.

In one embodiment, the cartridge is a thin plate that drops behind body armor. The cartridge may have a low profile that hugs the body, and is not bulky and does not take up a lot of space. Polymer materials may be used to form the cartridge that is inherently flexible. Fuel which is small and also flexible allows the cartridge to somewhat conform to the body.

Utilizing transient materials and triggers 130, the Transient Fuel Cell can be electrically triggered at the end of life to thermally vaporize quickly (in seconds) on command, or degrade slowly (days to weeks) under UV exposure in the ambient environment.

Figure 2B:
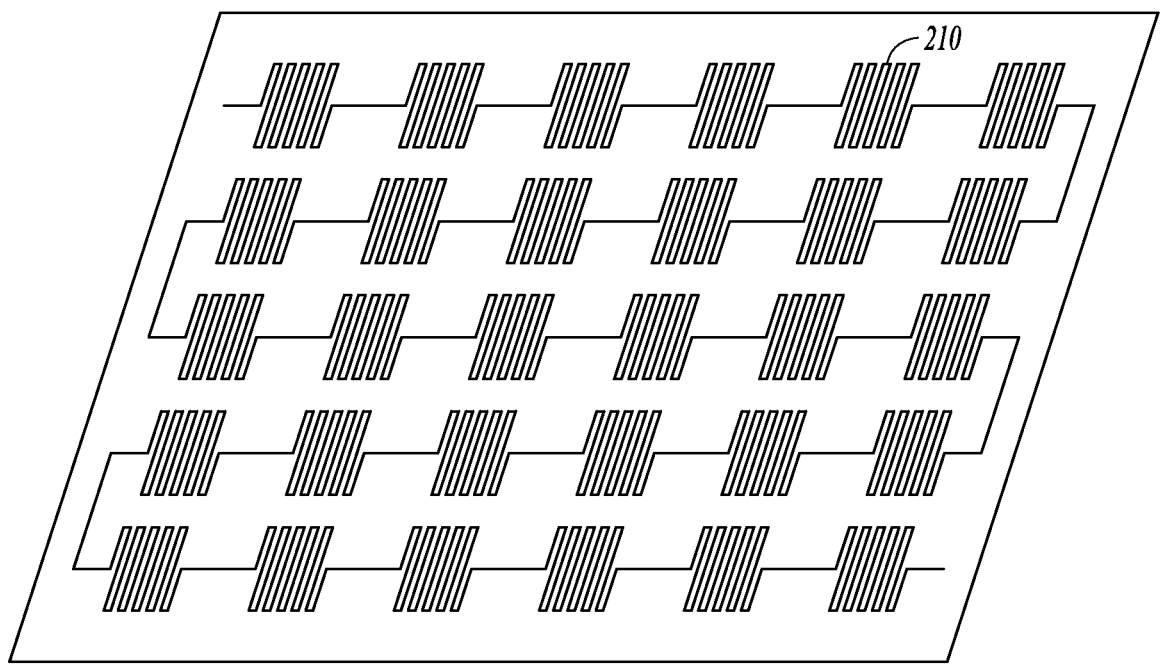
FIG. 2B is a perspective block representation of a surface of a transient fuel cell device having patterned resistors according to an example embodiment.

To thermally vaporize the transient fuel cell, one or more resistive heating elements 210, as seen in a perspective representation in FIG. 2B, are thermally coupled to the transient fuel cell may be coupled directly across the battery via the power management circuits to quickly heat the transient fuel cell to a temperature sufficient to vaporize the transient fuel cell. The heating elements 210 may be patterned directly on a polymer surface or surfaces of the TFC 100. The TFC may be configured to be electrically triggered at the end of life due to thermally vaporize on command, such as in seconds or 10 s of seconds, or to degrade slowly over one or more weeks in the ambient environment due to UV exposure and other environmental conditions.

As shown in FIG. 2B, the heating elements 210 may be configured as an array and dispersed uniformly over the surfaces to more uniformly vaporize the surfaces. In further embodiments where the thickness of a surface may vary, the density of the heating elements 210 may also correspondingly vary to ensure uniform vaporization. The density of heating elements 210 may be higher for thicker portions of a surface and lower for thinner portions of the surface. The heating elements may be powered by battery, or directly from electricity generated by the fuel cell while still operational, or both.

Any number of low-temperature vaporizable polymers may be used to provide transient properties, including polycarbonates, acrylics, polypropylene carbonates, polycyclohexane carbonates, polyphthalaldehyde, etc, with varying molecular weights. The polymer may include thermal acid generators to reduce its decomposition temperature, and photo acid generators to enable slow decomposition upon exposure to sunlight in the ambient environment.

The fuel may also be imbued with transient properties by controlling the geometry of a pelletized fuel to facilitate decomposition. In one embodiment, micro-pellets may be formed with 0.5 mm-3 mm cubes of porosity 5-25%. LAH grain size of 1-50 um, ZrCl4 grain size of 1-100 um, LNA (metal hydride) grain size of 1-200 um. In a further embodiment, macro pellets, 5-20 mm thick and 20-100 mm in x and y, of porosity 5-35%, LAH grain size of 1-50 um, ZrCl4 grain size of 1-100 um, and LNA (metal hydride) grain size of 1-200 um may be used. In still a further embodiment, alternate separate metal hydride pellets, 5-20 mm thick and 20-100 mm in x and y, of porosity 0-10% may be used. Grain sizes can be any subset within that range (ie metal hydride grains filtered to 100-150 um).

A hydraulic press and die may be used to form micro-pellets, such as pellets in the form of 1 mm cubes with rounded edges. Somewhat smaller and somewhat larger pellets, such as 0.5 to 3 mm cubes may also be used.

Transient capability enables soldiers—and special operators in particular—to discard spent power sources in the field without a leaving trace, and with minimal environmental impact.

In further embodiments, the transient fuel cell may be formed out of conventional plastic (polypropylene) or thin metal with or without exhibiting transient characteristics.

Figure 3:
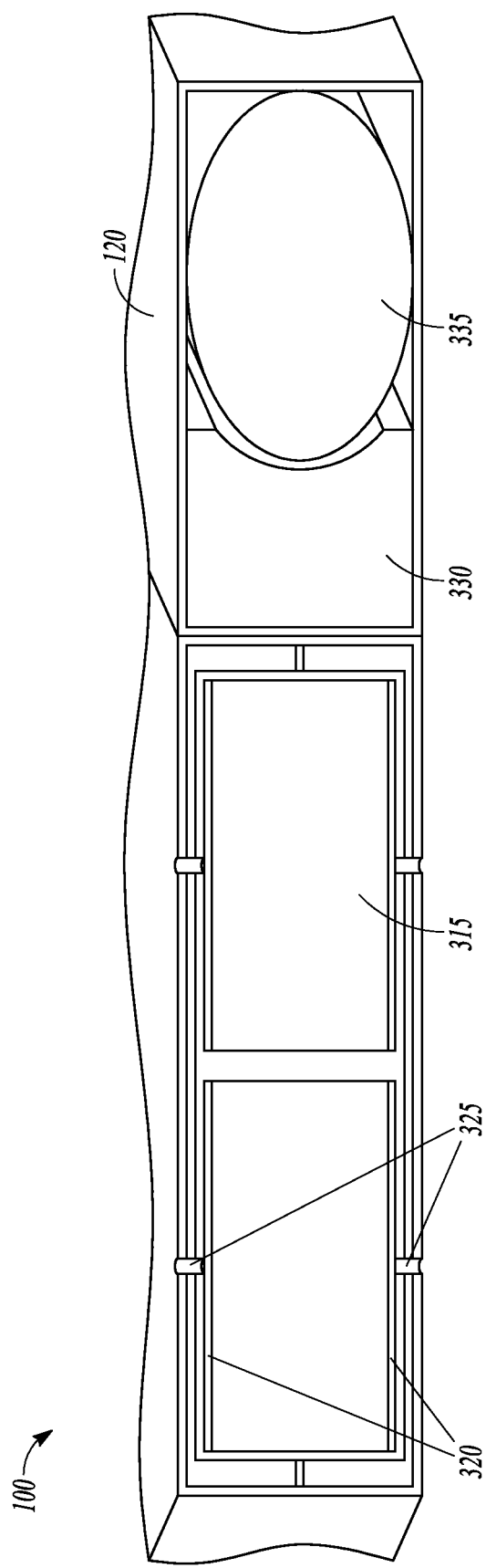
FIG. 3 is a cross section view illustrating elements inside a fuel cell device cartridge according to an example embodiment.

FIG. 3 is a cross section view illustrating elements inside of the cartridge 110. In one embodiment, TFC components may include adaptive thermal insulation 310 based on evacuated nano-porous silica with vapor feedback, a 20 W hydrogen generator/fuel formulation 315, transient fuel cell 320 with oxygen/water selectively permeable membrane, and one or more air access ports 325 for providing oxygen and water vapor. The electronics module 120 may include power management circuitry 330 which may be coupled to a charge storage device 335, such as battery 335. Charge storage device 335 may be a lithium ion battery to provide power for the power management circuits, store energy generated by the fuel cell, and to provide power to loads or to supplant electricity provided to loads by the fuel cell 320 during periods of high current demand by one or more loads. The electronics module 120 may be electrically coupled to the fuel cell through the container in some embodiments, such as through various plates and insulating material. The electronics module 120 may be detachably coupled to the TCF components for easy detachment such as via clamps or various other means for releasably attaching two elements.

Figure 4:
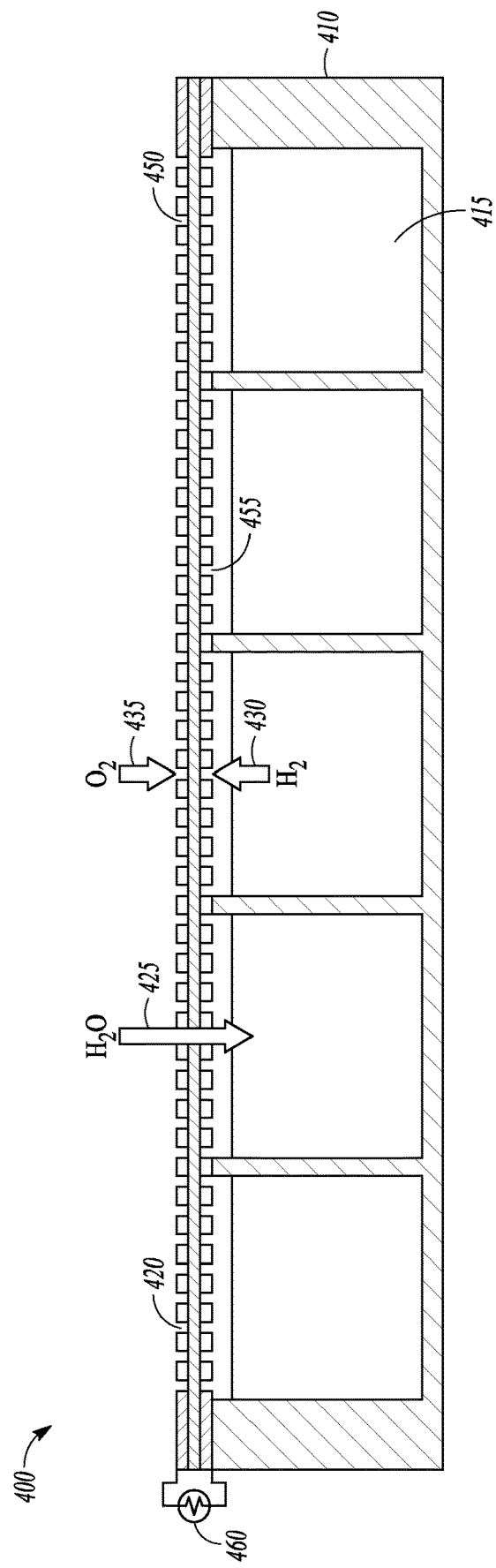
FIG. 4 is an illustration of an example fuel cell operation according to an example embodiment.

FIG. 4 is an illustration of an example fuel cell 400 operation. A description of chemistry and fluid flow with respect to fuel cell operation is included below. Fuel cell 400 has a cartridge 410, referred to as packaging, which may be transient in some embodiments. The cartridge holds a hydride fuel 415 and a PEM fuel cell 420. Water, in the form of water vapor is indicated at 425 as passing through the fuel cell to reach the hydride fuel 415, which generates hydrogen indicated by arrow 430 as being provided to an anode side of the PEM. Oxygen from ambient as indicated by arrow 435 to reaches a cathode side of the PEM.

The reaction at the cathode side 450 of the PEM is: $\frac{1}{2}O_2 + 2H^+ + 2e^- \rightarrow H_2O$. The anode side 455 reaction of the PEM is: $H2 \rightarrow 2H^+ + 2e^-$. This results in an electricity generating reaction: $4H_2 + 2O_2 \rightarrow 4H_2O + energy$. The hydrogen reaction is: $LiAlH_4 + 4H_2O \rightarrow 4H_2 + solids$. The net reaction is: $LiAlH_4 + 2O_2 \rightarrow energy + solids$. The PEM fuel cell converts hydrogen/oxygen to electricity, heat, and water vapor. Water vapor may be recovered through the fuel cell and used to generate more hydrogen from the fuel 415. The fuel cell may be electrically coupled to a load as indicated at 460 to provide the generated electricity to the load. The load may be an electrical storage device such as a battery, or may be electrical equipment, such as a radio, sensors, lights, and other equipment needing electrical power to operate.

Some newer fuel cells utilize a highly-restricted cathode to control a hydrogen generation rate and enable stable operation without a valve or valves. Cathode conductance may be designed to limit the amount of oxygen flow to the cathode to that which is required for a targeted power level. In doing so, the amount of "excess" water that flows into or out of the fuel cell is reduced, allowing the fuel cell to operate in a stable manner without a valve.

In order to guarantee stable operation when the ambient humidity is less than the cathode humidity (a condition in which water is slowly lost to ambient) the cathode limited fuel cell may contain, in addition to a chemical hydride fuel, a metal hydride material which provides hydrogen (without requiring a reaction with water to generate it) to offset the water lost to ambient.

Metal hydride materials have approximately half the energy density, and 1/10th the specific energy of chemical hydride fuels, and in the interest of achieving high performance (energy density and specific energy) it is desirable to limit the amount of metal hydride in the system, to provide just the amount required for operation under low humidity conditions. In some embodiments, all the hydrides and additives may be mixed together. In further embodiments, the metal hydride may be separate from the chemical hydride.

Water gained from the ambient environment (when the cathode humidity is less than the ambient humidity) generates unwanted hydrogen which raises the system pressure, resulting in increased hydrogen permeation losses which balance (on a molar ratio) the water gained. The extra water gained thus results indirectly in reduced performance (energy density and specific energy). It is therefore desirable to limit water gained from ambient.

A means to limit water loss (or gain) is provided without impacting the flow of oxygen to the cathode. The use of such a means enables reduction in the amount of metal hydride in the fuel cell and an increase in higher performing chemical hydride fuel. Less hydrogen is lost, improving fuel cell system performance. In one embodiment, the means to limit water loss comprises an oxygen-to-water selectively permeable membrane positioned at the fuel cell cathode. The oxygen-to-water selectively permeable membrane reduces the amount of water lost to (or gained from) ambient, resulting in improved performance and enabling an overall increase in fuel cell based power generator energy density and specific energy.

Figure 5:
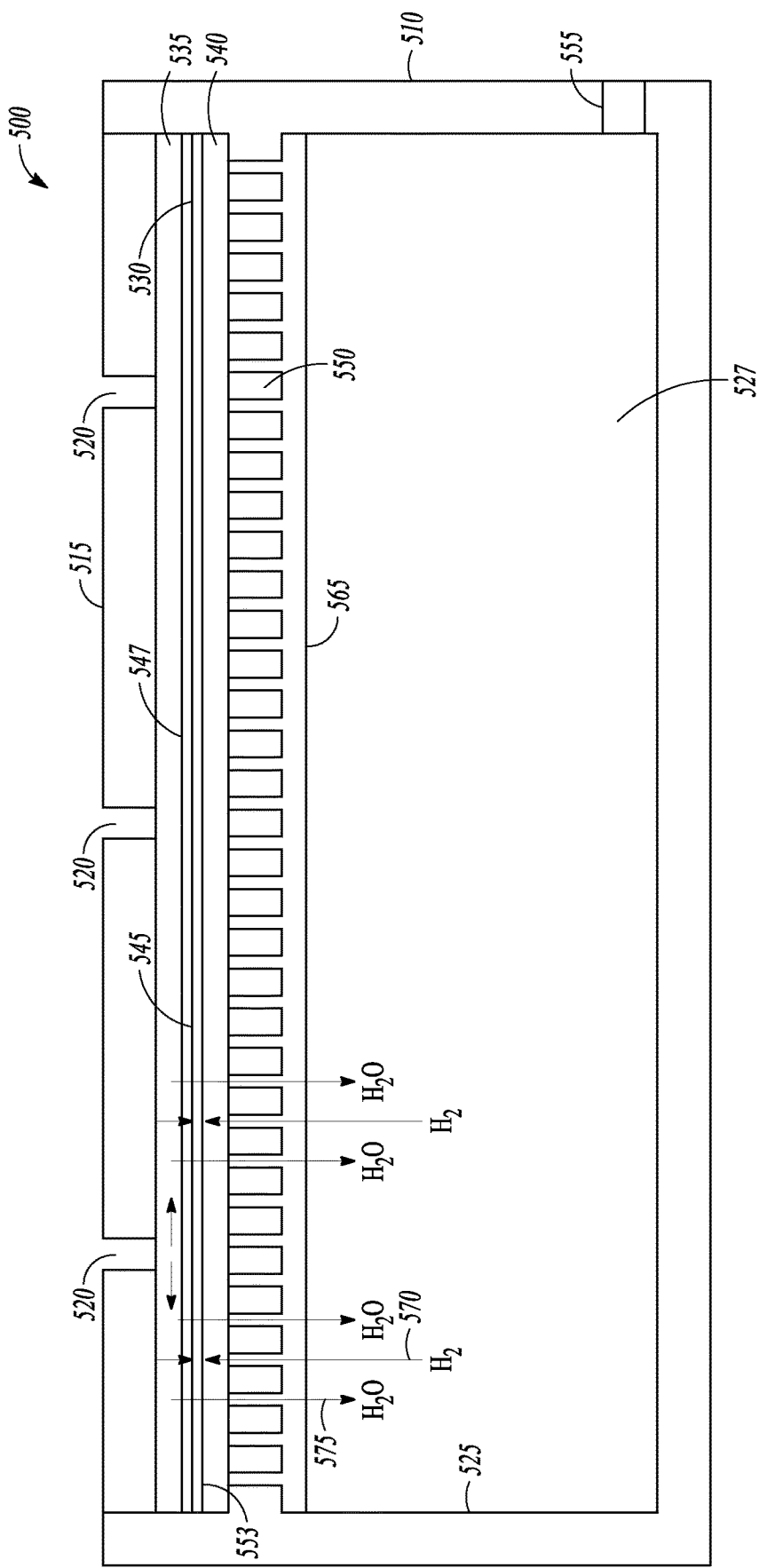
FIG. 5 is a block diagram cross section view of a power generator according to an example embodiment.

FIG. 5 is a block diagram cross section view of a power generator 500. Power generator 500 may include a container 510 having a top plate 515 containing an array of holes, which in one embodiment may be oxygen limiting pinholes 520. The container forms a chamber 525 to hold a chemical hydride fuel 527, which may also contain a relatively small amount of a metal hydride material in some embodiments to provide hydrogen during times of low water vapor availability.

A fuel cell membrane electrode assembly 530 is supported within the container between the top plate 515 and the chamber 525. The membrane electrode assembly 530 comprises a proton exchange membrane coated on both sides with catalyst electrode, the catalyst electrode may be patterned in various embodiments.

A first, gas diffusion layer 535 is supported between the fuel cell proton exchange membrane electrode assembly 530 and the top plate 515. A second gas diffusion layer 540 is supported between the membrane electrode assembly 530 and the chamber 525. The gas diffusion layers may comprise porous carbon fiber or carbon paper, and may include a micro porous layer on the side facing the membrane electrode assembly.

Figure 6:
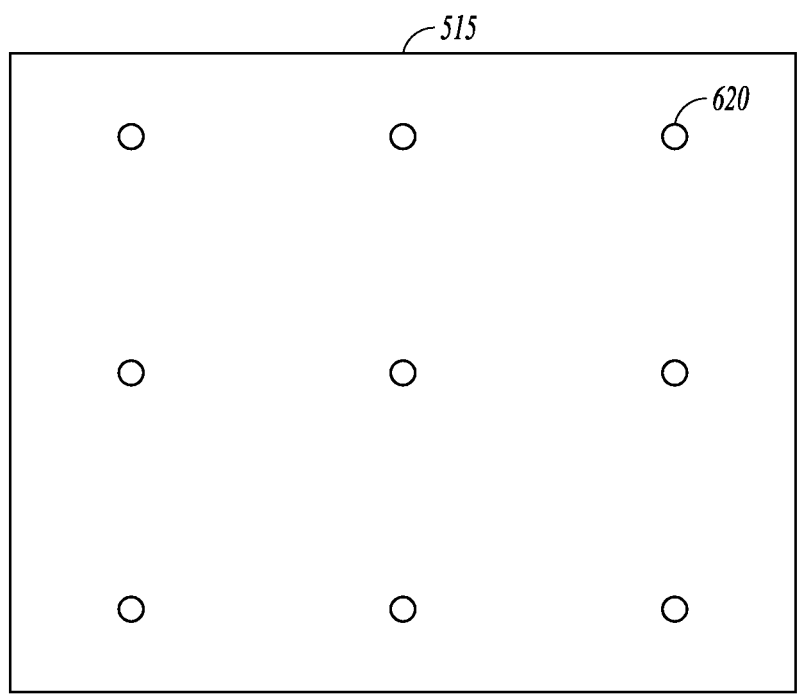
FIG. 6 is a top view of a top plate of the power generator of FIG. 5 illustrating an array of pinholes according to an example embodiment.

The array of oxygen limiting pinholes 520, shown in a top view of top plate 515 in FIG. 6, may be sized to limit oxygen supplied to a cathode side 545 of the fuel cell proton exchange membrane electrode assembly 530.

An oxygen-to-water selectively permeable membrane 547 is positioned between ambient and the cathode side 525 of the proton exchange membrane electrode assembly 530. In FIG. 5, the oxygen-to-water selectively permeable membrane 547 is positioned between the top plate 515 and gas diffusion layer 535, enabling oxygen to flow through the pinholes 520, and resisting the flow of water vapor, both from ambient toward the cathode side 545 and from the cathode side toward ambient. In further embodiments, the oxygen-to-water selectively permeable membrane 547 may be supported on an ambient exposed side of the top plate 515, or sandwiched in the middle of the top plate 515, which may be split in two pieces with matching pinholes as shown in a later figure.

The oxygen-to-water selectively permeable membrane in one embodiment comprises a porous film, such as polytetrafluorethylene (PTFE), or a porous metal sheet. An $O_2$ selective liquid may be mobilized into the film. The $O_2$ selective liquid may be a silicone oil, such as polydimethylsiloxane or dimethylpolysiloxane, or combinations thereof. The porous film may have pore structures that have micrometer and sub-micrometer size. In further embodiments, means of providing an oxygen-to-water selectively permeable membrane may use other materials now known or hereinafter developed.

In one embodiment, the oxygen limiting pinholes have a size corresponding to a design point to provide an average power of a selected load, such as for example 500 mW. Note that in some embodiments, the oxygen-to-water selectively permeable membrane 547 may replace the function of the pinholes to regulate the power provided. In such embodiments, the pinholes may have a size and density suitable for supporting the membrane, which may have selectivity values greater than 4. The pinholes 520, in addition to the oxygen-to-water selectively permeable membrane 547 may also serve to limit the amount of water vapor provided to the power generator from ambient atmosphere. Limiting the water vapor from ambient may have an added benefit of reducing the power generator operating pressure under hot and humid conditions, as less water reaches the fuel, limiting over production of hydrogen from the fuel.

Water vapor produced by the chemical reaction of the hydrogen and oxygen at the fuel cell proton exchange membrane electrode assembly 530 cathode side 545 is provided back to the fuel as indicated by arrows 575 and is sufficient to keep the power generator generating the design point average power.

Some loads may include energy storage devices, such as a super capacitor or a rechargeable battery, which may be charged utilizing the average power provided by the power generator. The load may use the stored energy for providing pulses of higher power, such as when transmitting sensed values in the case of the load being a wireless sensor.

In some embodiments, the fuel cell reaction utilizes 0.5 moles of hydrogen per mole of water produced. The $O_2$ concentration in air (ambient) is approximately 20%, and the water concentration typically ranges from 1-2% resulting in an oxygen to water ratio of 10 to 20×. Given these parameters, the size and density of the pinholes in the top plate 515 that provide oxygen to the cathode may be easily designed for a known average power level. With the use of the oxygen-to-water selectively permeable membrane 547, the water ratio becomes less relevant in determining the size and density of the pinholes 520. The pinholes may have a round cross section in one embodiment, or may be any shape desired and may be formed by laser cutting, punching, molding, or other means. Example hole numbers for various temperatures and power levels are shown in the following TABLE 1:

TABLE 1

Number of 0.003 mil diameter holes in a 0.006 mil thick top plate, for various temperatures and power levels.

| Temperature ° C. | Number of 3 mil holes for 0.5 W | Number of 3 mil holes for 1 W | Number of 3 mil holes for 1.5 W |
|---|---|---|---|
| 0 | 1124 | 2248 | 3372 |
| 10 | 1094 | 2188 | 3282 |
| 20 | 1066 | 2132 | 3198 |
| 30 | 1040 | 2080 | 3120 |
| 40 | 1015 | 2030 | 3045 |

For holes having half the area of 3 mil holes, it may take twice as many holes. Using smaller holes will result in even more holes to achieve the various power levels in TABLE 1, while fewer larger holes may be used.

The oxygen limiting pinholes in one embodiment may be coupled to ambient atmosphere to obtain exposure to oxygen. The oxygen-to-water selectively permeable membrane 547 and to some extent, the pinholes, restrict water vapor from ambient atmosphere such that oxygen is the primary regulator of electricity generated by the fuel cell proton exchange membrane. The oxygen limiting pinholes in one embodiment, may be configured to regulate oxygen provided to the cathode of the fuel cell proton exchange membrane electrode assembly to control electricity generated. By placing the pinholes in the top plate, between ambient and the first gas diffusion layer and the cathode side of the fuel cell proton exchange membrane electrode assembly, a very short diffusion path for oxygen is provided. This may also allow the fuel cell portion of the power generator to be made fairly thin, since additional paths for flow of oxygen, water vapor, or hydrogen may be reduced or eliminated.

In one embodiment, the cathode layer is continuous across the power generator with the pinholes positioned uniformly to distribute oxygen to the cathode layer. In the case of a patterned cathode layer, the pin holes may be aligned or centered over each cathode pattern to facilitate oxygen distribution. In some embodiments, the top plate may contain channels adjacent the first diffusion layer extending from the pin holes to assist in distributing oxygen from the pin holes to the cathode layer. In other embodiments, the first diffusion layer provide sufficient oxygen distribution.

In one embodiment, a perforated support plate 550 is supported by the container 510 between the second diffusion layer 540 and the bottom chamber 525. The perforated support plate 550 contains perforation to allow unrestricted flow of hydrogen and water vapor between the fuel in the chamber 525 and the second diffusion layer 540 which is adjacent an anode 553 side of the proton exchange membrane. Suitable adhesives may be used to adhere the various fuel cell layers together in some embodiments, or the layers may simply be supported between the top plate 515 and support plate 550. In various embodiments, the container and plates may be formed of metal, polymer, or other materials that are compatible with the fuel cell, chemical fuel, and membrane materials.

In a further embodiment, a hydrogen pressure relief valve 555 is supported by the container and is located in the chamber to provide a pressure relief path to ambient to vent hydrogen when the pressure within the chamber exceeds a selected threshold. Valve 555 may open to vent the hydrogen if more hydrogen is produced than can be consumed by the fuel cell. Ambient conditions or lower energy demand by a load may contribute to excess hydrogen being produced resulting in a pressure that exceeds the pressure threshold of the valve 555.

In one embodiment, the chamber 525 may be filled with the chemical hydride fuel 527, a primary water reactive hydrogen producing fuel, separated from the fuel cell proton exchange membrane electrode assembly by a particulate filter 565. Many different chemical hydrides may be used for the hydrogen producing fuel, such as for example AlH3, LiAlH4, LiH, NaAlH4, CaH2, and NaH as well as others in various embodiments. Fuel including Li may provide for desirable recycling of spent fuel blocks, which in some embodiments are replaceable in the power generator. The fuel may be formed with an engineered particle size, distribution, and controlled density. For example, the fuel may be formed in a hydraulic press with a die, and contain particle sizes in the range of 1 to 100 μm. In one embodiment, the size of the particles may be between 5 to 10 μm. The particles may all be the same size, or may have different ranges of particle sizes within one or more of the above ranges. In one embodiment, particle sizes outside of the above ranges are limited so as to not adversely affect performance of hydrogen generation and utilization of the fuel.

In further embodiments, a metal hydride material may be included for use in generating hydrogen when insufficient water vapor is available to meet load demands. Some example metal hydrides that may be reversed or recharged with hydrogen include $LaNi_5H_5$, $FeTiH_2$, $Mg_2NiH_4$, and $TiV_2H_4$.

In one embodiment, the hydrogen-generating fuel composition can include both a metal hydride (e.g., an interstitial intermetallic hydride, such as LaNi5-xAlx wherein x is about 0 to about 1), and a chemical hydride (e.g., an ionic hydride or a covalent hydride, such as magnesium hydride (MgH2), lithium hydride (LiH), aluminum hydride (AlH3), calcium hydride (CaH2), sodium aluminum hydride (NaAlH4), sodium borohydride (NaBH4), lithium aluminum hydride (LiAlH4), ammonia borane (H3NBH3), diborane (B2H6), palladium hydride, LaNi5H6, TiFeH2, and a combination thereof). In some embodiments, the hydrogen-generating composition can include a uniform blend of the chemical hydride, the metal hydride, and the Lewis acid. In some embodiments, the hydrogen-generating composition can include the metal hydride separate from a mixture of the chemical hydride and the Lewis acid, such as a fuel pellet including a metal hydride and a different fuel pellet including an intimate mixture of a chemical hydride and a Lewis acid.

The Lewis acid can be any suitable Lewis acid, such that the hydrogen-generating composition can be used as described herein. The Lewis acid can be an inorganic compound or an organometallic compound in which a cation of the Lewis acid is selected from the group consisting of scandium, titanium, vanadium, chromium, manganese, iron, cobalt, copper, zinc, boron, aluminum, yttrium, zirconium, niobium, molybdenum, cadmium, rhenium, lanthanum, erbium, ytterbium, samarium, tantalum, and tin. The anion of the Lewis acid can be a halide.

The Lewis acid can be chosen from aluminum chloride (AlCl3), aluminum bromide (AlBr3), aluminum fluoride (AlF3), stannous (II) chloride (SnCl2), stannous (II) bromide (SnBr2), stannous (II) fluoride (SnF2), magnesium chloride (MgCl2), magnesium bromide (MgBr2), magnesium fluoride (MgF2), zirconium (IV) chloride (ZrCl4), zirconium (IV) bromide (ZrBr4), zirconium (IV) fluoride (ZrF4), tungsten (VI) chloride (WCl6), tungsten (VI) bromide (WBr6), tungsten (VI) fluoride (WF6), zinc chloride (ZnCl2), zinc bromide (ZnBr2), zinc fluoride (ZnF2), ferric (III) chloride (FeCl3), ferric (III) bromide (FeBr3), ferric (III) fluoride (FeF3), vanadium (III) chloride, vanadium (III) bromide, vanadium (III) fluoride, and a combination thereof. The Lewis acid can be chosen from aluminum chloride (AlCl3), magnesium chloride (MgCl2), zirconium (IV) chloride (ZrCl4), and a combination thereof. The Lewis acid can be zirconium (IV) chloride (ZrCl4).

Hydrogen generated in the fuel cartridge is transported to, as indicated by arrows 570, and consumed at the anode side 553 of the fuel cell, while oxygen in the ambient airflow through the pin holes is consumed at cathode side 545 of the fuel cell proton exchange membrane electrode assembly 530. The fuel cell produces water vapor and heat when reacting the hydrogen and oxygen, as well as electricity. Some of the water vapor generated at the cathode side 545 may proceed back to the fuel cartridge as indicated by arrows 575 for use in generating more hydrogen.

Figure 7:
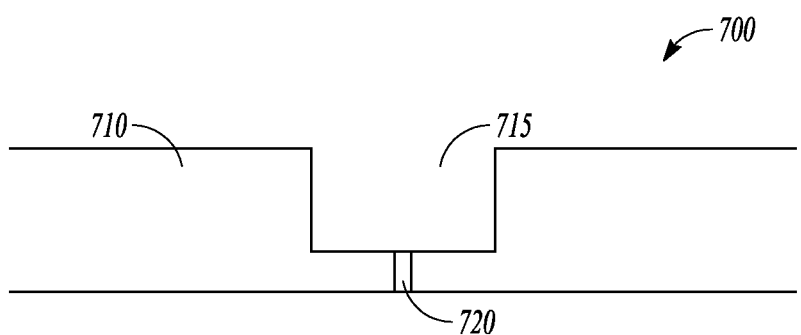
FIG. 7 is a cross section illustrating an alternative pinhole arrangement in a top plate according to an example embodiment.

FIG. 7 is a cross section illustrating an alternative pinhole arrangement at 700 in a top plate 710. Top plate 710 may contain an array of openings exposed to ambient, one of which is indicated at 715. The openings 715 extend partially through the top plate. A pinhole 720 may be formed in a bottom of one or more of the openings 715. The openings 715 have a larger cross section than the pinholes 720. The larger cross section may be useful in preventing fouling of the oxygen path, which might be problematic in some operating environments for pinholes extending all the way through the top plate 710. Fouled pinholes would result in reduce power generation as oxygen flow would be further constrained. By reducing the length of the pinhole to a shorter distance, fouling is less likely. An oxygen-to-water selectively permeable membrane 725 is included adjacent the pinhole 720 in one embodiment.

In further embodiments, many more rows and columns of pinholes may be provided and may be distributed in different patterns than that shown. While the pinholes in one embodiment are centered on repeating patterns of membrane electrode assemblies, they may be dispersed in different patterns themselves. In some embodiments, multiple pinholes may be distributed about each repeating pattern of membrane electrode assemblies. The membrane electrode assemblies may also be formed of different patterns, which need not be uniform. In one embodiment, the total cross sectional area of all the pinholes is selected to meet the average power requirements of an expected load.

Adaptive thermal insulation technology utilizing nanoporous technology enables the high temps/temp stability required to scale demonstrated chemical hydride micro fuel cell technology to 20 W power, and maintain such power over the mil spec temperature range, providing a revolutionary increase in energy density, specific energy, and environmental range vs. state of the art batteries and fuel cells.

A vacuum-based thermal insulator provides thermal resistance requirements of applications requiring thin insulation, and can be made in a wide range of custom form factors.

Figure 8:
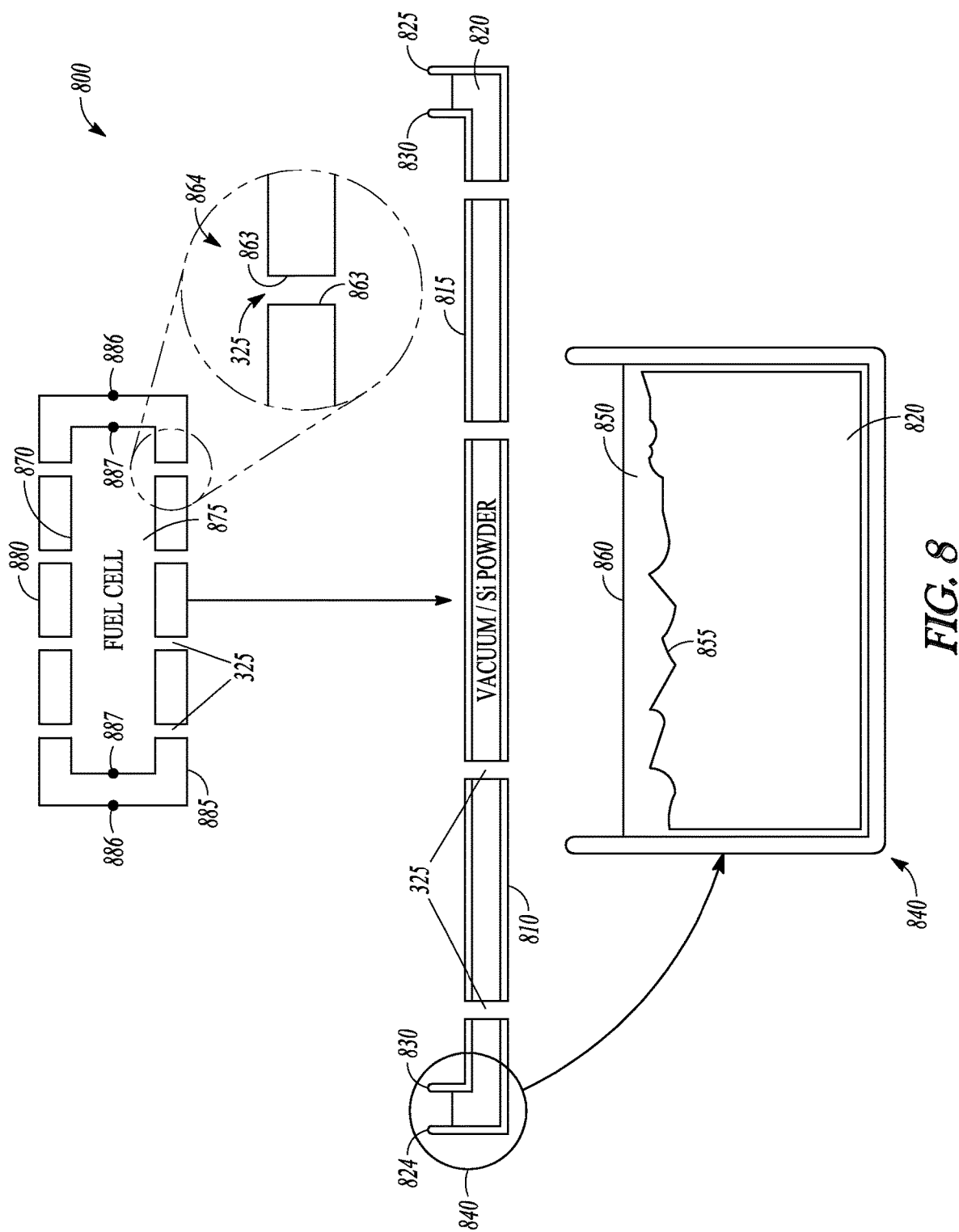
FIG. 8 is an illustration of thermal insulation of a cartridge according to an example embodiment.

FIG. 8 is an illustration of thermal insulation of the cartridge 800. In one embodiment, internal temperatures may be maintained within an operating range of 30-90° C. The TFC design produces heat along with electrical power, so sufficient insulation will meet operating range requirements. Adaptive thermal insulation may be optimized by achieving desired thermal resistance-temperature profile, selecting optimal vapor generating material (any of a number of organics to make the thermal resistance decrease at high temperatures, enabling passive feedback), optimizing formulation of nano-porous silica (e.g. density, radiation absorbers, glass fibers for structural stability), creating perforations to provide air access to fuel cell, developing ALD coating process to seal perforations while maintaining high thermal resistance, and developing gas-impermeable coatings for transient polymer packaging to maintain adequate background pressure.

Cartridge 800 may be formed for an outside plate 810 spaced from an inside plate 815 by a nano-porous material 820. The thermal insulation may be formed for an outside plate 810 spaced from an inside plate 815 by a nano-porous material 820. In one embodiment, the plates may be similarly shaped and of slightly different sizes such that the inside plate 815 may nest inside the outside plate 810, creating a space between them that the material 820 occupies. In one embodiment, the space may be fairly uniform between the plates.

In one embodiment, the plates have sides indicated at 825 and 830 that extend away from generally planar portions of the plates. The distance between the sides 825 and 830 may be the same as the distance between the generally planar portions of the plates, or may vary in further embodiments. The shape of the generally planar portion of the nested plates may be circular, oval, rectangular, or any other shape desired, such as a polygon. The sides of the plates extend along the entire perimeter of the generally planar portions. In still further embodiments, the generally planar portions of the plates may be curved as opposed to planar. Note that while the distance between the plates and sides of the plates is substantially equal in some embodiments, the distance may be varied in further embodiments where substantially uniform insulation is not needed.

A portion 840 of the sides of the plates is illustrated in further detail in a blown-up view also at 840. The blown-up view of portion 840 illustrates a sealing layer 850 that helps maintain a vacuum within the nano-porous material 820. In one embodiment, the sealing layer 850 includes a layer of a polymer 855, such as parylene or other low thermally conducting material and a metal layer 860 of low thermally conducting metal, such as aluminum or NiCr for example. A further polymer or other layer may be included in further embodiments. Note that a similar sealing layer 863 may be used for air access ports 325 such that the ports 325 do not thermally short the outer and inner plates 810 and 815 as shown in blown up portion 864. Note that since this is a block diagram, the holes are as openings to clearly show that air flows through the air access ports 325. If shown in true cross section form, horizontal lines would be included, representing the continuation of the plates.

In one embodiment, the polymer or plastic layer 855 may be between approximately 50 to 200 um thick. The metal layer may be approximately 80 nm thick. The purpose of the sealing layer 850 is to help maintain a vacuum, which may be simply a low pressure as opposed to an absolute vacuum, within the space between the plates. Thus, the thickness of each layer may be varied based on the material used to maintain the vacuum for a desired length of time. Since the metal layer may be more thermally conductive, it is desirable in some embodiments to utilize a metal and a thickness of the metal that minimizes its thermal conductance between the plates. The vacuum provides an area of low thermal conductance, K. As such, it may be varied between absolute and ambient pressure depending on the overall thermal properties desired. Ambient pressure may correspond to atmospheric pressure, which may vary with weather conditions and altitude or depth. In one embodiment, the vacuum is kept between 0 and 100 Pa (Pascal-Newtons/Meter$^2$). Note that the portion 840 shown is provided for illustration of the sealing layer 850 and may not be reflective of the actual shape of the portion 840.

In one embodiment, the material 820 may be a low-density (200-250 kg/m^3) mixture of fumed silica, fiberglass, and silicon carbide (and optionally getter materials to getter gas resulting from outgassing or leakage through the seal) may be pressed into a custom form factor enclosure, such as the two nesting plates 810 and 815. The fumed silica mixture fills the gap between the two nested plates that comprise an enclosure. The mixture is a nano-porous open cell material in one embodiment such that a significant portion of the value occupied by the material is open, as opposed to closed cell materials. A small gap thermally isolates the two plates; this gap is may be coated with a thin, low-thermal conductivity material (or materials) and forms a gas seal as indicated by sealing layer 850.

The space between the plates is evacuated, forming an enclosure with very high thermal resistance between the inner and outer plates. In one embodiment, a device 870, such as a fuel cell based power generator, can be placed within a pocket 875 created by two enclosures or sets of plates 880 and 885, and provide very high thermal resistance between the interior of the pocket and ambient environment. The two sets of plates 880, 885 may be sealed at 886, 887 to form an insulating enclosure 800 around device 870. Seal 886 represents a sealing together of outer plates of the sets of plates, while seal 887 represents a sealing together of inner plates of the sets of plates. The seals 886 and 887 may be obtained via glue, weld, adhesive, or clamping in various embodiments. By pressing the core insulating nano-porous material 820 between two solid plates and sealing only a small gap, thin, custom 3-D shapes to encapsulate fuel cells and other electronics may be created. Adaptive insulation based on evacuated nano-porous silica may provide approximately 10 times the thermal resistance of conventional insulation.

The insulating enclosure 800 is formed with a thin thickness as described above with respect to FIG. 2A. The insulating enclosure 800 allows for high operating temperatures without causing wearer discomfort. The high operating temperatures enable faster reaction rates and thinner fuel cross sections while maintaining desired power output. If the fuel were thicker the average power would be lower due to longer diffusion lengths in the fuel.

In some embodiments, a vapor generating material is included in the material 820. The vapor generating material may have a pressure vs. temperature relationship that modulates the thermal conductance of the vapor in the gap between the enclosure plates, over a desired temperature range.

The vapor generating material may be selected such that vapor pressure is in a desired range (e.g. 100-1000000 Pa for Nano-porous silica) which modulates the thermal conductivity of the vapor over the desired ambient temperature range. Example materials include cyclohexane or water vapor. Different vapor generating materials may be selected depending on the pore size of the silica. Low density, small pore size materials other than silica may also be used if a different thermal resistance value or temperature range is desired. Other materials may include Isopropanol, 1-Butanol, Cyclohexane, Ethanol, and Ethyl acetate. In some embodiments, only one of the example materials or still other materials which generate vapor at a desired temperature is used.

For any particular embodiment, the vapor generating material may be selected on the basis of the desired temperature range of the application and the pore size of the powder. By matching an overall change in pressure for the desired temperature range with the pressure range that creates the largest change in gas conductivity at a given pore size, the design can be optimized for a given application.

Figure 9:
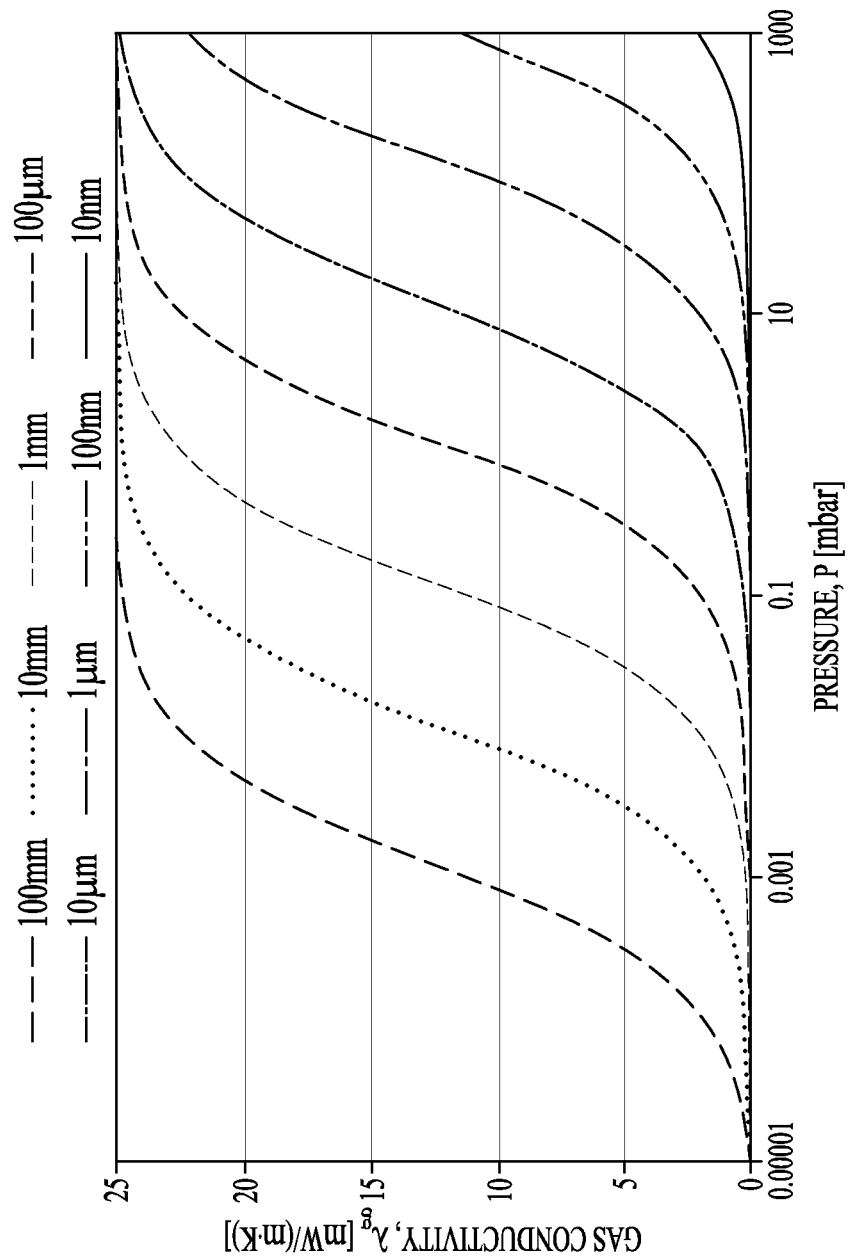
FIG. 9 is a chart illustrating calculated gas conductivity for air as a function of gas pressure for different characteristic system size according to an example embodiment.

FIG. 9 is a chart illustrating calculated gas conductivity for air as a function of gas pressure for different characteristic system size according to an example embodiment. The input temperature was 20° C., and the pore sizes are indicated by format of the line at the top of the figure, ranging from 10 nm to 100 mm. Note that the use of pores in the nanometer range allow operation at higher pressures for a same level of thermal conductivity, which may be easier to achieve and maintain over long periods of time.

A method for forming a thermal enclosure is as follows:
1) Mixing a fumed silica, silicon carbide, fiber glass, and optionally getter material to create a nano-porous material. Note that such mixing is well known in the art as described in at least three papers, such as Dry Powder Processing of Fibrous Fumed Silica Compacts for Thermal Insulation Hiroya Abe,*,w Isami Abe, Kazuyoshi Sato,* and Makio Naito* 2005; Experimental characterisation and evaluation of the thermo-physical properties of expanded perlite—Fumed silica composite for effective vacuum insulation panel (VIP) core M. Alama, H. Singha,*, S. Brunnerb, C. Nazirisa 2015; Performance properties of vacuum insulation panels produced with various filling materials Metin Davraz* and Hilmi C. Bayrakci 2014.

In one embodiment, the mixture is composed of 70-90% fumed silica of approximately 10 um grain size, 1-10% SiC powder of approximately 0.5 um grain size, and 5-15% glass fibers, 1-2 mm×10 um. These are mixed mechanically at low speed (<1000 rpm) for several minutes.

2) Pressing the silica mixture between two plates that comprise the enclosure.

3) In a partial vacuum (<1000 Pa), deposit a conformal coating (e.g. 10-100 um of a polymer such as parylene) to cover the silica in the gap between the plates, forming a gas seal.

4) In a partial vacuum (<1000 Pa), deposit a layer of metal (e.g. 10-1000 nm of Al, NiCr) to cover the parylene.

5) Optionally repeat the polymer/metal coating process to create a multi-layer seal which further reduces permeability (increases lifetime)

The fumed silica mixture in one embodiment may be was 2/88/10% SiC/Fumed Silica/Glass fiber.

6) Optionally, add the vapor generating material to the gap. Alternatively, the vapor generating material could be added during the initial polymer coating process, by filling the deposition chamber with the desired material (provided it doesn't interfere with the deposition process). The vapor may also be introduced via other means, by for example breaking a capsule of the material within the gap, after the seal has been deposited. The capsule may be broken by any means that does not adversely degrade the seal, such as by sound waves or heat.

In some embodiments, the resulting adaptive insulation based on nano-porous silica provides approximately 10 times the thermal resistance of conventional insulation.

The use of a temperature dependent vapor pressure enables modulation of the thermal resistance. The thermal resistance may decrease at high temperatures within the enclosure, allowing heat to be transferred to ambient. At lower temperatures, the thermal resistance may increase.

Figure 10:
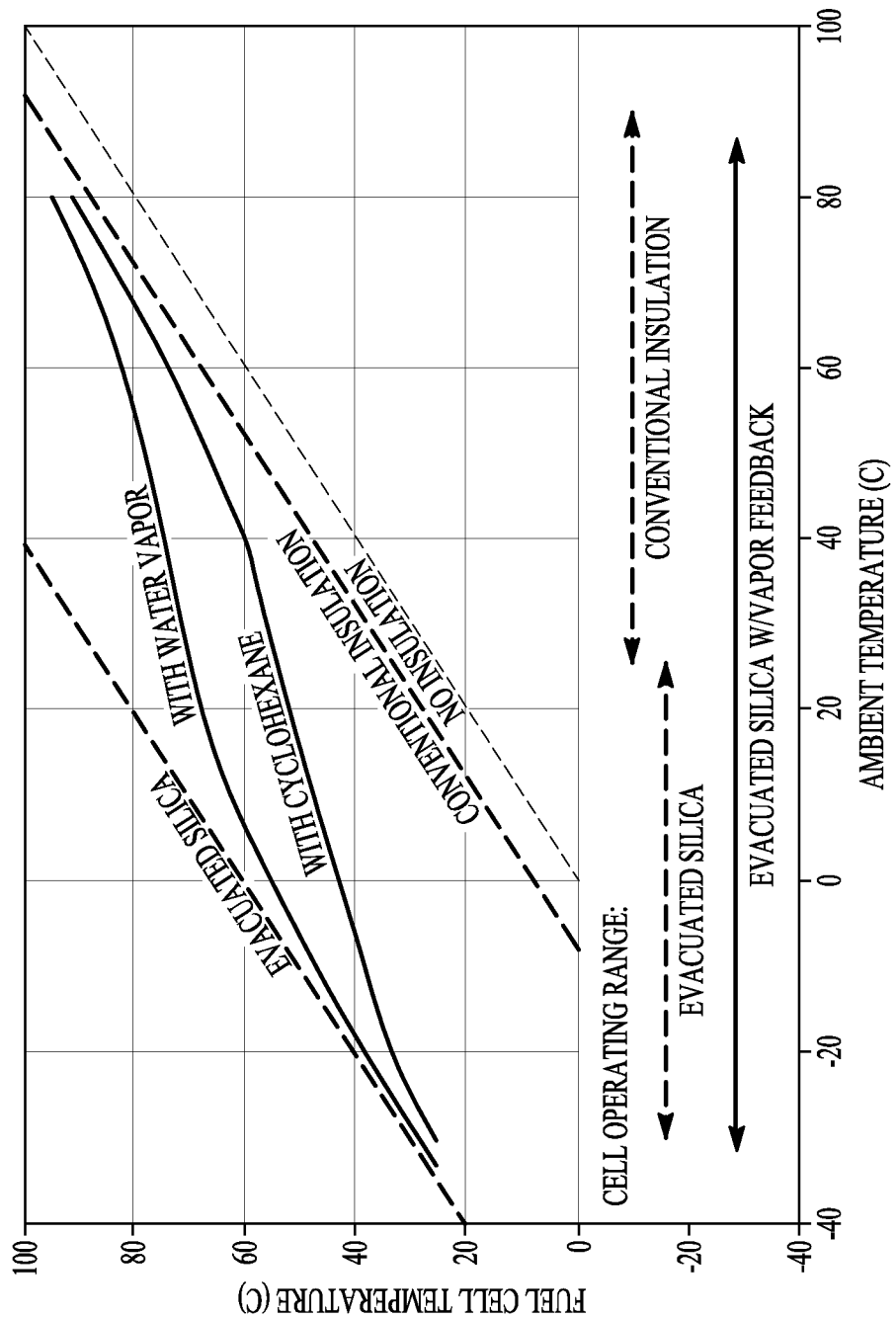
FIG. 10 is a graph illustrating temperature of a fuel cell device versus ambient temperature according to an example embodiment.

FIG. 10 is a graph illustrating temperature of a fuel cell device versus ambient temperature. With a low thermal conductivity insulation design, the internal temperature of an enclosure can get too warm at high ambient temperatures, limiting an operating range of the fuel cell. Using the adaptive insulation with an appropriate vapor pressure temperature characteristics facilitates passive temperature feedback, expanding the operating range from −30° C. to 80° C. ambient.

Figure 11:
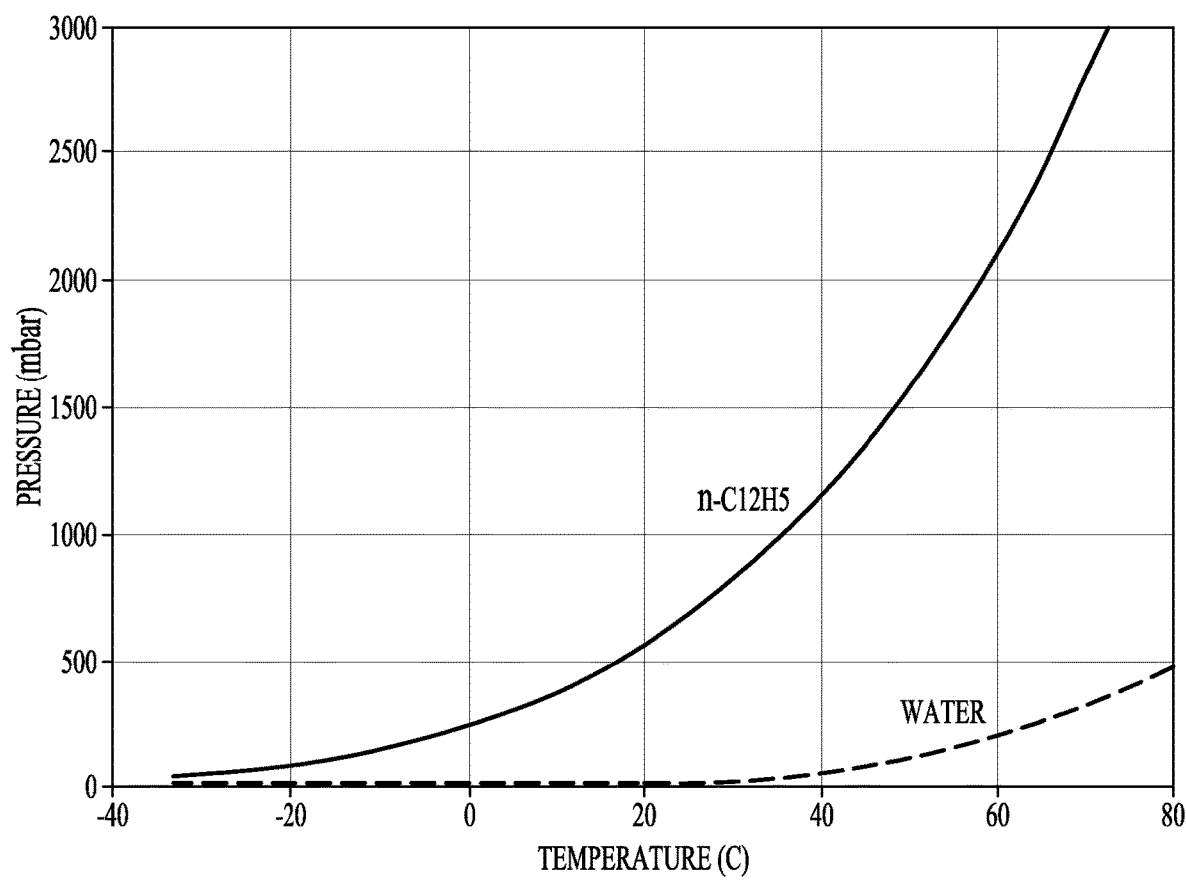
FIG. 11 is a graph illustrating temperature versus pressure for two different vapors according to an example embodiment.

FIG. 11 is a graph illustrating temperature versus pressure for two different vapors such as a vapor including water and a vapor including n-C12H5.

Figure 12:
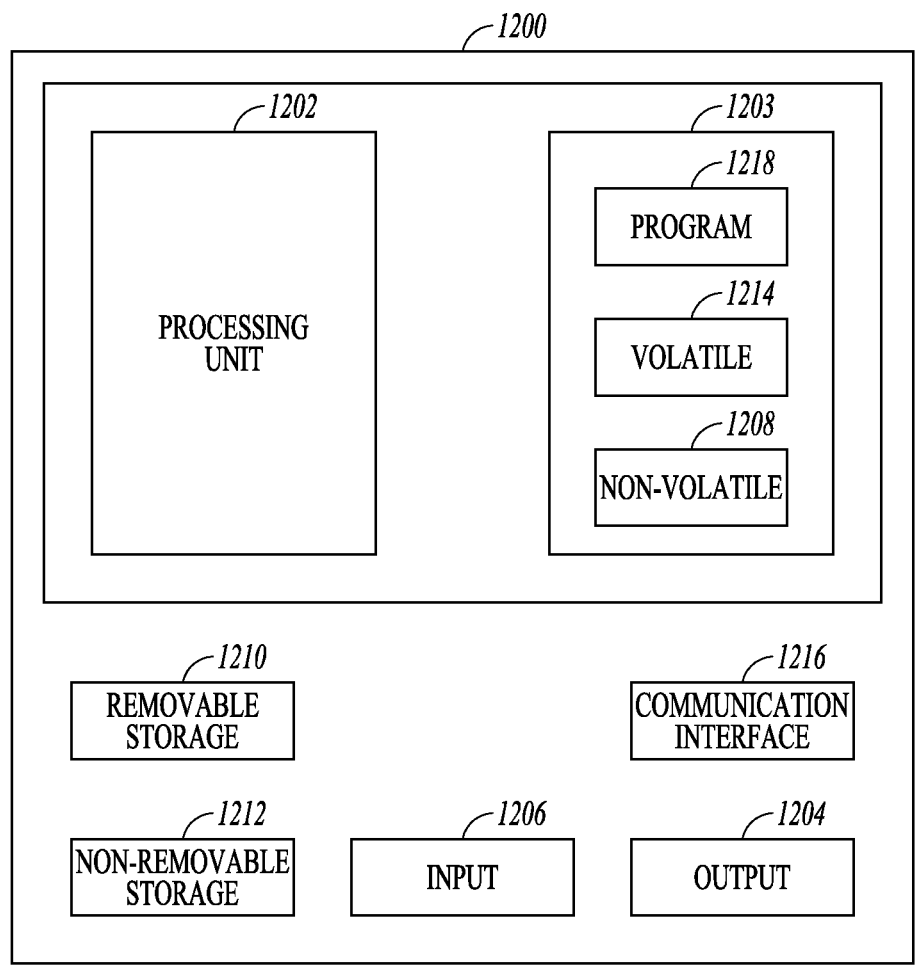
FIG. 12 is a block diagram illustrating circuitry for performing power management and other functions according to an example embodiment.

FIG. 12 is a block schematic diagram of a computer system 1200 to implement the electronics module 120 and methods performed by it according to example embodiments. All components need not be used in various embodiments. One example computing device in the form of a computer 1200, may include a processing unit 1202, memory 1203, removable storage 1210, and non-removable storage 1212. Although the example computing device is illustrated and described as computer 1200, the computing device may be in different forms in different embodiments. For example, the computing device may instead be a smartphone, a tablet, smartwatch, or other computing device including the same or similar elements as illustrated and described with regard to FIG. 12. Devices such as smartphones, tablets, and smartwatches are generally collectively referred to as mobile devices. Further, although the various data storage elements are illustrated as part of the computer 1200, the storage may also or alternatively include cloud-based storage accessible via a network, such as the Internet.

Memory 1203 may include volatile memory 1214 and non-volatile memory 1208. Computer 1200 may include— or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

Computer 1200 may include or have access to a computing environment that includes input 1206, output 1204, and a communication interface 1216. Output 1204 may include a display device, such as a touchscreen, that also may serve as an input device. The input 1206 may include one or more of a touchscreen, touchpad, mouse, keyboard, camera, one or more device-specific buttons, one or more sensors integrated within or coupled via wired or wireless data connections to the computer 1200, and other input devices. The computer may operate in a networked environment using the communication interface 1216 to connect to one or more remote computers, such as database servers, including cloud based servers and storage. The remote computer may include a personal computer (PC), server, router, network PC, a peer device or other common network node, or the like. The communication interface 1216 may include a Local Area Network (LAN), a Wide Area Network (WAN), cellular, WiFi, Bluetooth, or other networks.

Computer-readable instructions stored on a computer-readable storage device are executable by the processing unit 1202 of the computer 1200. A hard drive, CD-ROM, and RAM are some examples of articles including a non-transitory computer-readable medium such as a storage device. The terms computer-readable medium and storage device do not include carrier waves. For example, a computer program 1218 may be used to cause processing unit 1202 to perform one or more methods or algorithms described herein.

Further details regarding a fuel cell having an oxygen selective membrane are now provided.

EXAMPLES

1. A power generator comprising:
   a container having a cross section suitable for wearing by a person, the container including a nano-porous insulation;
   a fuel cell and fuel cell cartridge disposed within the container; power management electronics supported by the container and coupled to the fuel cell;
   a charge storage device supported by the container and electrically coupled to the power management electronics and the fuel cell; and
   a connector supported by the container and coupled to the charge storage device to distribute power to one or more electrical loads.

2. The power generator of example 1 wherein the charge storage device comprises a rechargeable lithium based battery.

3. The power generator of any of examples 1-2 wherein the insulation comprises silica encased in a polymer.

4. The power generator of any of examples 1-3 wherein the power generator further comprises an oxygen permeable/water vapor impermeable membrane disposed between the fuel cell and ambient.

5. The power generator of any of examples 1-4 wherein the container is formed of a transient polymer.

6. The power generator of any of examples 1-5 wherein the container comprises:
  a vaporizable polymer substrate patterned with resistors; and
  a switch to couple the charge storage device to the resistors.

7. The power generator of any of examples 1-6 wherein the insulation comprises a vapor generating material to provide adaptive thermal insulation.

8. The power generator of example 7 wherein the vapor generating material decreases thermal resistance responsive to increasing temperature.

9. The power generator of any of examples 1-8 and further comprising a hydrogen generating fuel, wherein the hydrogen generating fuel comprises a pelletized chemical hydride.

10. The power generator of example 9 wherein the pelletized chemical hydride comprises cubes having rounded corners.

11. The power generator of example 10 wherein the cubes have a size of 0.5 mm-3 mm and a porosity of 5-25%.

12. The power generator of any of examples 9-11 wherein the fuel further comprises metal hydride and a Lewis acid.

13. The power generator of any of examples 1-12 wherein the container comprises one or more air access ports to provide ambient air to the fuel cell.

14. The power generator of example 13 wherein the one or more air access ports comprise a sealing layer to avoid thermally shorting the nano-porous insulation.

15. A method comprising:
  providing ambient air through an insulated container to a fuel cell based power generator, the air providing oxygen to a cathode of a fuel cell and water to a hydrogen producing fuel, wherein the insulated container has a cross section suitable for wearing by a person and the container includes a nano-porous insulation;
  generating hydrogen via the hydrogen producing fuel;
  providing the hydrogen to an anode of the fuel cell;
  generating electricity via the fuel cell responsive to being provided oxygen and hydrogen; and
  proving the generated electricity to a charge storage device for powering at least one electrical load external to the insulated container via an electrical connector.

16. The method of example 15 wherein the ambient air is provided through the insulated container via sealed air access points extending through the insulated container.

17. The method of any of examples 15-16 and further comprising vaporizing the insulated container.

18. The method of example 17 wherein vaporizing the insulated container comprises providing electricity to patterned resistors on the container, wherein the container is formed of a vaporizable polymer substrate and the electricity is provided via the charge storage device.

19. The method of any of examples 15-18 wherein the insulated container comprises a vapor generating material to provide adaptive thermal insulation responsive to temperature changes.

20. The method of example 20 and further comprising:
  decreasing thermal resistance of the insulated container responsive to increasing temperature via the vapor generating material; and
  increasing thermal resistance of the insulated container responsive to decreasing temperature via the vapor generating material.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A power generator comprising:
  a container having a cross section suitable for wearing by a person, the container including a nano-porous insulation;
  a fuel cell and fuel cell cartridge enclosed within the container;
  power management electronics supported by the container and coupled to the fuel cell;
  a charge storage device supported by the container and electrically coupled to the power management electronics and the fuel cell; and
  a connector supported by the container and coupled to the charge storage device to distribute power to one or more electrical loads.

2. The power generator of claim 1 wherein the charge storage device comprises a rechargeable lithium based battery.

3. The power generator of claim 1 wherein the insulation comprises silica encased between nesting polymer plates.

4. The power generator of claim 1 wherein the power generator further comprises an oxygen-to-water selectively permeable membrane disposed between the fuel cell and ambient.

5. The power generator of claim 1 wherein the container is formed of a transient polymer.

6. The power generator of claim 5 wherein the container comprises:
  a vaporizable polymer substrate patterned with resistors; and
  a switch to couple the charge storage device to the resistors.

7. The power generator of claim 1 wherein the insulation comprises a vapor generating material to provide adaptive thermal insulation.

8. The power generator of claim 7 wherein the vapor generating material decreases thermal resistance responsive to increasing temperature.

9. The power generator of claim 1 and further comprising a hydrogen generating fuel wherein the hydrogen generating fuel comprises a pelletized chemical hydride.

10. The power generator of claim 9 wherein the pelletized chemical hydride comprises cubes having rounded corners.

11. The power generator of claim 10 wherein the cubes have a size of 0.5 mm-3 mm and a porosity of 5-25%.

12. The power generator of claim 9 wherein the fuel further comprises metal hydride and a Lewis acid.

13. The power generator of claim 1 wherein the container comprises one or more air access ports to provide ambient air to the fuel cell.

14. The power generator of claim 13 wherein the one or more air access ports comprise a sealing layer to avoid thermally shorting the nano-porous insulation.

15. A power generator comprising:
a container having nesting walls formed of a transient polymer, the container having a cross section suitable for wearing by a person, and the container including a nano-porous insulation encapsulated between the nesting walls of the container;
a hydrogen based fuel cell and fuel cell cartridge enclosed within the container and having oxygen restricting pinholes separating a cathode of the fuel cell from ambient;
power management electronics supported by the container and coupled to the fuel cell;
a charge storage device supported by the container and electrically coupled to the power management electronics and the fuel cell; and
a connector supported by the container and coupled to the charge storage device to distribute power to one or more electrical loads.

16. The power generator of claim 15 wherein the container is shaped as a flat rectangle adapted to fit into body armor pockets.

17. The power generator of claim 15 wherein the nesting walls are sealed with the nano-porous insulation being held at a reduce pressure from atmospheric pressure.

18. The power generator of claim 15 wherein the power generator further comprises an oxygen-to-water selectively permeable membrane disposed between the fuel cell and ambient.

19. The power generator of claim 15 wherein the insulation comprises a vapor generating material to provide adaptive thermal insulation.

20. The power generator of claim 19 wherein the vapor generating material decreases thermal resistance responsive to increasing temperature.

21. The power generator of claim 15 wherein the container comprises:
a vaporizable polymer substrate patterned with resistors; and
a switch to couple the charge storage device to the resistors.

* * * * *